US012809110B2

(12) United States Patent
Kang et al.

(10) Patent No.: US 12,809,110 B2
(45) Date of Patent: *Nov. 24, 2026

(54) OPTICAL ALIGNMENT APPARATUS AND METHOD FOR SURFACE MOUNTABLE OPTICAL MODULE

(71) Applicant: ELECTRONICS AND TELECOMMUNICATIONS RESEARCH INSTITUTE, Daejeon (KR)

(72) Inventors: Haechung Kang, Daejeon (KR); Eun Kyu Kang, Daejeon (KR); Jong Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 262 days.

This patent is subject to a terminal disclaimer.

(21) Appl. No.: 18/485,784

(22) Filed: Oct. 12, 2023

(65) Prior Publication Data

US 2024/0126041 A1 Apr. 18, 2024

(30) Foreign Application Priority Data

Oct. 13, 2022 (KR) ........................ 10-2022-0131597
Aug. 4, 2023 (KR) ........................ 10-2023-0102122

(51) Int. Cl.
*G02B 27/00* (2006.01)
*G01B 9/02* (2022.01)
(Continued)

(52) U.S. Cl.
CPC ......... *G02B 7/003* (2013.01); *G01B 9/02089* (2013.01); *G02B 6/25* (2013.01); *G02B 27/0012* (2013.01)

(58) Field of Classification Search
CPC ...... G02B 7/003; G02B 6/25; G02B 27/0012; G02B 6/4221; G02B 6/4246; G02B 6/3803; G02B 6/3628; G02B 6/36; G01B 9/02089
(Continued)

(56) References Cited

U.S. PATENT DOCUMENTS 6,456,766 B1 * 9/2002 Shaw .................... G02B 6/423 385/47
6,593,037 B1 * 7/2003 Gabriel .................. B82Y 10/00 430/5
(Continued)

FOREIGN PATENT DOCUMENTS

JP H08313746 A * 11/1996 ............... G02B 6/13
JP 2001-83371 A 3/2001
(Continued)

*Primary Examiner* — Isiaka O Akanbi

(57) ABSTRACT

An apparatus and method for performing optical alignment between optical waveguide elements in manufacturing a surface mountable optical module, in which a plurality of optical waveguide elements are mounted on a surface of a mounting substrate, is disclosed. A controller performs recognition of the interference pattern included in the image information received from the camera, observes parallelism between the substrate support and the mounting substrate and between the mounting substrate and the optical waveguide element using the recognized pattern, generates a control signal to control the transport device according to the observed parallelism, and transmits the control signal to the transport device to perform control of the optical waveguide element.

18 Claims, 4 Drawing Sheets

(51) Int. Cl.
*G02B 6/25* (2006.01)
*G02B 7/00* (2021.01)

(58) Field of Classification Search
USPC ......................... 356/508, 399, 432, 213, 138
See application file for complete search history.

(56) References Cited

U.S. PATENT DOCUMENTS 6,782,170 B2 * 8/2004 Stayt, Jr. ............ G02B 6/12004 385/52
6,853,778 B2 * 2/2005 Helbing ................... G02B 6/42 385/49
8,699,012 B2 4/2014 Duis et al.
9,423,397 B2 * 8/2016 Duer .................... C12Q 1/6825
9,541,714 B2 1/2017 Lim et al.
9,715,062 B2 * 7/2017 Choraku ................ G02B 6/428
10,444,448 B2 10/2019 Jung et al.
10,459,177 B2 10/2019 Kim et al.
2003/0021539 A1 * 1/2003 Kwon ...................... G02B 6/30 385/52
2004/0212802 A1 * 10/2004 Case .................... G02B 6/4236 356/401
2006/0110107 A1 * 5/2006 Sasaki .................. G02B 6/4245 385/88
2007/0058912 A1 * 3/2007 Ohara .................. G02B 6/4226 385/97
2009/0305147 A1 * 12/2009 Constancias .............. G03F 1/32 430/5
2010/0178596 A1 * 7/2010 Constancias .............. G03F 1/34 430/5
2011/0110622 A1 * 5/2011 Akutsu ................ G02B 6/4225 385/14
2015/0093070 A1 * 4/2015 Sugama ................... G02B 6/30 264/1.25

FOREIGN PATENT DOCUMENTS

JP 6765687 B2 10/2020
KR 10-2019-0010138 A 1/2019

* cited by examiner

OPTICAL ALIGNMENT APPARATUS AND METHOD FOR SURFACE MOUNTABLE OPTICAL MODULE

CROSS-REFERENCE TO RELATED APPLICATIONS

This application claims priority to and the benefit of Korean Patent Application No. 10-2022-0131597, filed on Oct. 13, 2022, and Korean Patent Application No. 10-2023-0102122, filed on Aug. 4, 2023, the disclosures of which are incorporated herein by reference in their entirety.

BACKGROUND

1. Field of the Invention

The present invention relates to an optical communication module, and more specifically, to an apparatus and method for performing optical alignment between optical waveguide elements in manufacturing a surface mountable optical module, in which a plurality of optical waveguide elements are mounted on a surface of a mounting substrate.

2. Discussion of Related Art

Recently, with the rapid growth of industries such as data centers and artificial intelligence, miniaturization, higher integration, and higher speed of an optical transceiver module or optical module have come to be required due to the requirements for transmitting and receiving more data in a short time.

An optical transceiver module mainly includes an optical sub-assembly (OSA), which serves to perform conversion (electro-optic conversion or photoelectric conversion) between an optical signal and an electrical signal, and an electrical sub-assembly (ESA) which serves to perform a signal processing function on the electrical signal. In this case, the OSA includes a transmitter optical sub-assembly (TOSA) which converts the electrical signal to an optical signal and transmits the optical signal, and a receiver optical sub-assembly (ROSA) which converts the received optical signal into an electrical signal.

In order to secure maximum optical coupling efficiency when manufacturing core optical device such as the TOSA and the ROSA, the precise optical alignment between the optical elements such as a light source (for example, a laser diode (LD)), a photo detector (for example, a photo diode (PD)), a minor, a lens, a waveguide, etc., which are in an optical transceiver module, is necessary. In particular, diameters of optical waveguides of planar waveguide circuit devices (PLC) using high refraction silica which includes a single mode fiber (SMF) for long-distance transmission and optical wavelength distributers disposed in the middles of transmission lines are 9 μm or less, and thus a precise optical alignment apparatus and method is necessary to effectively collect optical signals between optical elements and the optical waveguides. In addition, recently, as the multisource agreement (MSA) standards for quad small form-factor pluggable (QSFP-DD) for transceivers of 400 Gbps or more, e.g., 800 Gbps, 1.6 Tbps, etc., optical transceivers are completed, the technical requirements for integrating multichannel optical elements having 4 or more channels, such as 8 or 16, in a limited space, in which each basic speed is 100 Gbps or 200 Gbps per channel are increasing.

Accordingly, both securing of the precision of optical alignment and a bonding process and a decrease in optical alignment process time per channel are emerging as major issues for improving productivity. In the case of a multichannel optical module to which silicon photonics, which is a typical highly integrated optical module technology, is applied, in order to satisfy market requirements for high integration and low cost through simplification and miniaturization of an optical coupling structure, a butt joint which directly bonds an optical waveguide of an optical fiber block (FAB) to an optical waveguide of a silicon photonics element without using a focused optical lens is used.

As illustrated in FIG. 1, alignment between optical waveguides of a butt joint structure is performed by performing optical alignment on optical waveguides 20 disposed in an optical waveguide element 10 and optical waveguides 40 disposed in another optical waveguide element 30 in 6-axis directions of x, y, z, Rx, Ry, and Rz. Successively, the alignment is performed by applying and curing a resin 50 such as an epoxy on bonding surfaces of the optical waveguide elements to mutually fix the optical waveguides 20 and 40. In such a butt joint structure, a precise surface alignment process should be performed in advance to secure the straightness of an optical waveguide path, minimize distances between the waveguides, and secure the mechanical strength and reliability of the bonding surface. However, if it is difficult to secure a sufficient contact area between end portions of the both optical waveguide elements 10 and 30, it is difficult to secure surface alignment accuracy because it is difficult to observe a surface alignment state. And so, it is difficult to secure reproducibility of a gap between bonding surfaces of both end portions, and thus there is a limit to securing the consistent mechanical strength against external forces such as mechanical shock, vibration, and temperature changes after the process. In general, 1) if the gap between the bonding surfaces of both waveguides increases, there are disadvantages that an amount of resin filling therebetween increases and a bonding strength decreases, and a curing time of the resin increases; 2) if the bonding surfaces of both waveguides do not remain parallel to each other, the resin being applied on bonding portions is unevenly distributed according to a position of the bonding surface. Therefore, an amount of shrinkage which occurs during the curing of the resin varies according to the position on the bonding surface, and thus alignment angle and position errors occur between the optical waveguides.

Meanwhile, in the case of surface mountable joint in which optical waveguide elements 10 and 30 are mounted on a separate mounting substrate 60 as illustrated in FIG. 2, since there is an advantage of securing a sufficient contact area between waveguides, it is advantageous for securing a bonding strength of a bonding interface between the waveguides and the substrate, however, like the butt joint structure described above, there is still a disadvantage that it is difficult to secure reproducibility of a gap between bonding surfaces of contact surfaces between the waveguides and the substrate. In order to solve these problems of a surface mountable joint structure, an optical alignment method of observing a surface alignment state between optical waveguides and a mounting substrate to minimize a gap between bonding surfaces and improving surface alignment accuracy to secure mechanical strength, process reproducibility, and reliability is required.

SUMMARY OF THE INVENTION

It is an object of the present invention to provide an optical alignment apparatus and method which may observe a contact surface alignment state (parallelism) between an optical waveguide and a mounting substrate to minimize a gap between bonding surfaces and improve surface alignment accuracy in optical coupling of a surface mountable optical module, thereby securing mechanical strength, process reproducibility and reliability.

In order to solve the objectives, a parallel state between bonding surfaces of a waveguide element and a mounting substrate is secured in advance through a surface alignment process of recognizing an interference pattern between the mounting substrate and the waveguide element, the mounting substrate that the optical alignment target waveguide element is mounted thereon is transferred to a bonding position of the waveguide element, and when contact between the waveguide element and the mounting substrate is detected, the transport device is controlled and moved as much as a desired distance from a point at which the contact is detected.

Specifically, according to one aspect of the present invention, there is provided an optical alignment apparatus of a surface mountable optical module with an optical waveguide element mounted on a mounting substrate, which includes a substrate support on which a mounting substrate is secured; a holder which holds an optical waveguide element to be mounted on the mounting substrate; a transport device which transports the optical waveguide element held by the holder; a camera which outputs image information obtained by capturing an image of an interference pattern generated by light incident on the optical waveguide element; and a controller configured to perform recognition of the interference pattern included in the image information received from the camera, observe parallelism between the substrate support and the mounting substrate and between the mounting substrate and the optical waveguide element using the recognized pattern, generate a control signal to control the transport device according to the observed parallelism, and transmit the control signal to the transport device to perform control of the optical waveguide element.

According to another aspect of the present invention, there is provided an optical alignment method for a surface mountable optical module with an optical waveguide element mounted on a mounting substrate secured on a substrate support, which includes outputting, by a camera, image information obtained by capturing an image of an interference pattern generated when light is incident on an optical waveguide element mounted on a mounting substrate; and performing, by a controller including a computer processor, pattern recognition on the interference pattern included in the image information, observing parallelism between the substrate support and the mounting substrate and between the mounting substrate and the optical waveguide element using the recognized pattern, generating a control signal to control a transport device according to the observed parallelism, and performing control of the optical waveguide element using the generated control signal.

Solutions to solve the above-described objectives will be further clarified through embodiments of the invention described below with reference to the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. Terms used in the following description are provided to describe the exemplary embodiments of the present invention and not for purposes of limitation. In the specification, unless the context clearly indicates otherwise, the singular forms include the plural forms. In addition, the terms "comprise," "comprising," and the like are used to specify some stated components, steps, operations, and/or elements, but do not preclude the presence or addition of one or more other components, steps, operations, and/or elements.

Figure 1:
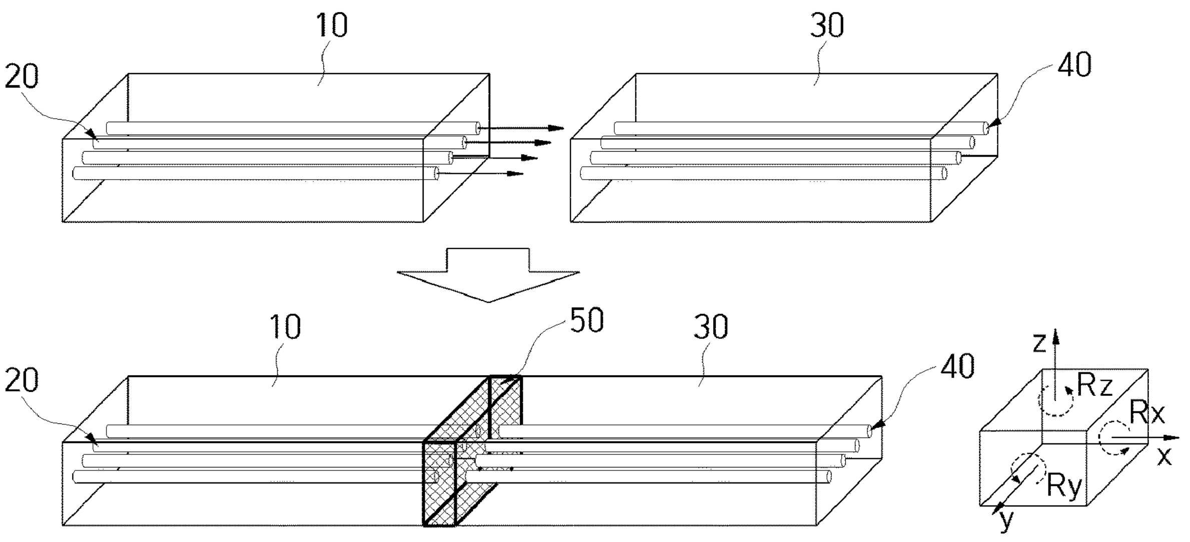
FIG. 1 is an explanatory view of a butt joint between optical waveguide elements.
Figure 2:
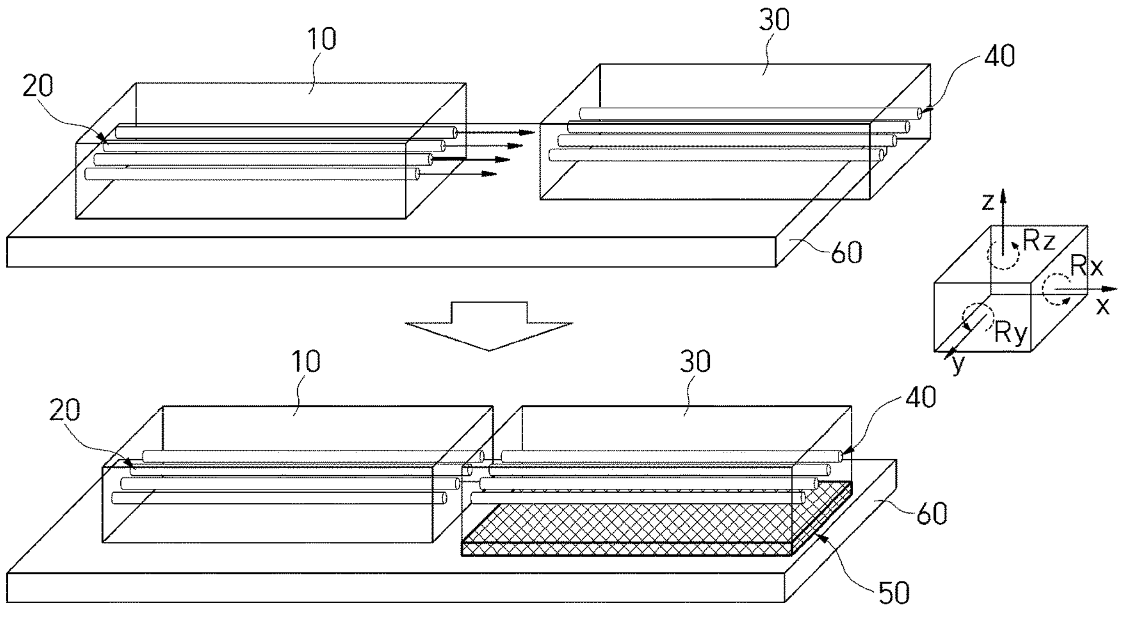
FIG. 2 is an explanatory view of a surface mount joint between optical waveguide elements.
Figure 3:
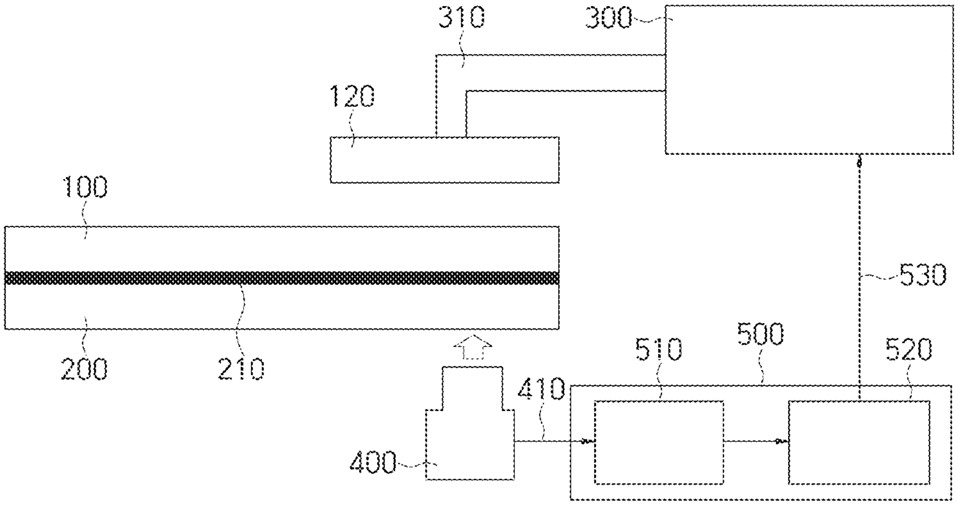
FIG. 3 is a diagram illustrating an optical alignment apparatus of a surface mountable optical module according to one embodiment of the present invention.

FIG. 3 is a diagram illustrating an optical alignment apparatus of a surface mountable optical module (a module in which an optical waveguide element is mounted on a mounting substrate) according to one embodiment of the present invention. In FIG. 3, for optical alignment during surface mount optical coupling between optical waveguide elements, an exemplary optical alignment apparatus for a surface-mounted optical module, wherein a surface alignment state between the optical waveguide element and the mounting substrate is observed so that a constant gap is maintained between bonding surfaces with respect to an entire area of each of the bonding surfaces, and additionally, the gap between the bonding surfaces of the optical waveguide element and the mounting substrate is adjusted to be minimized.

The optical alignment apparatus according to the embodiment includes a substrate support 200 on which a mounting substrate 100 is secured, so that the substrate support and the mounting substrate are given the same inclined surface. The substrate support 200 may be manufactured of a transparent material, and a reflective layer 210 capable of reflecting predetermined light may be formed on a surface of the substrate support 200 in contact with the mounting substrate 100.

There are a holder 310 which holds an optical waveguide element 120 to be mounted on the mounting substrate 100 secured on the substrate support 200 and a transport device

300 which transports the optical waveguide element 120 along 6 axes of x, y, z, Rx, Ry, Rz.

In addition, there is a camera 400 for observing an alignment state between the substrate support 200 and the mounting substrate 100 and between the mounting substrate 100 and the optical waveguide element 120. The camera 400 captures an image of an interference pattern, which varies by the parallelism between the substrate support 200 and the mounting substrate 100 and between the mounting substrate 100 and the optical waveguide element 120. Accordingly, the camera 400 may be installed at any position at which such image of the interference pattern may be captured. However, in the embodiment of FIG. 3, in order to avoid interference with the holder 310 positioned above the substrate support 200, the camera 400 is installed under the substrate support 200 so as to capture the image of the interference pattern through the transparent substrate support 200.

The camera 400 captures the image of the interference pattern and outputs image information 410 of the captured image. The interference pattern included in the image information 410 is input to a controller 500 and recognized by a pattern recognition unit 510, and a transport device control unit 520 transmits, to the transport device 300, a control signal 530 for controlling the transport device 300 in accordance with a recognized pattern 515 to control a position of the optical waveguide element 120 held by the holder 310 along the 6 axes. Accordingly, the optical alignment of the mounting substrate 100 and the optical waveguide element 120 may be maintained.

Pattern recognition and control signal generation performed by the controller 500 and other functions which help those functions may be performed by artificial intelligence technology. For example, the artificial intelligence technology may learn the image information of the image captured by the camera 400 and related data and infer the controlled variables for precise control of the transport device.

Figure 4:
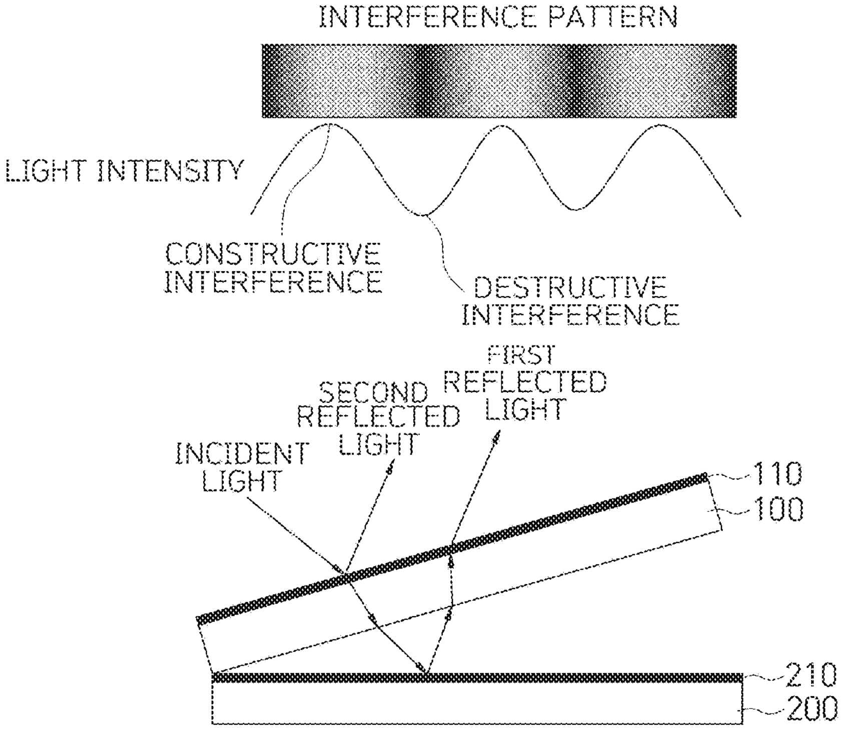
FIG. 4 is an explanatory view of a phenomenon in which an interference pattern is generated due to a difference in optical paths between substrates.

In this case, a principle of using an interference pattern for alignment between the substrate support 200 and the mounting substrate 100 and between the mounting substrate 100 and the optical waveguide element 120 will be described. FIG. 4 illustrates a phenomenon in which an interference pattern is generated due to parallelism of the substrate support 200 and the mounting substrate 100. As illustrated in FIG. 4, when the mounting substrate 100 is positioned on the substrate support 200, incident light is reflected by a first reflective surface 210 of the substrate support 200 and a second reflective surface 110 of the mounting substrate 100. In this case, first reflected light from the first reflective surface 210 and second reflected light from the second reflective surface 110 have a difference in paths corresponding to a gap between the substrate support 200 and the mounting substrate 100. According to the difference in the paths, the first reflected light and the second reflected light make mutual constructive or destructive interference, and thus an interference pattern in which a brightness (intensity of light) is periodically changed is generated.

Figure 5:
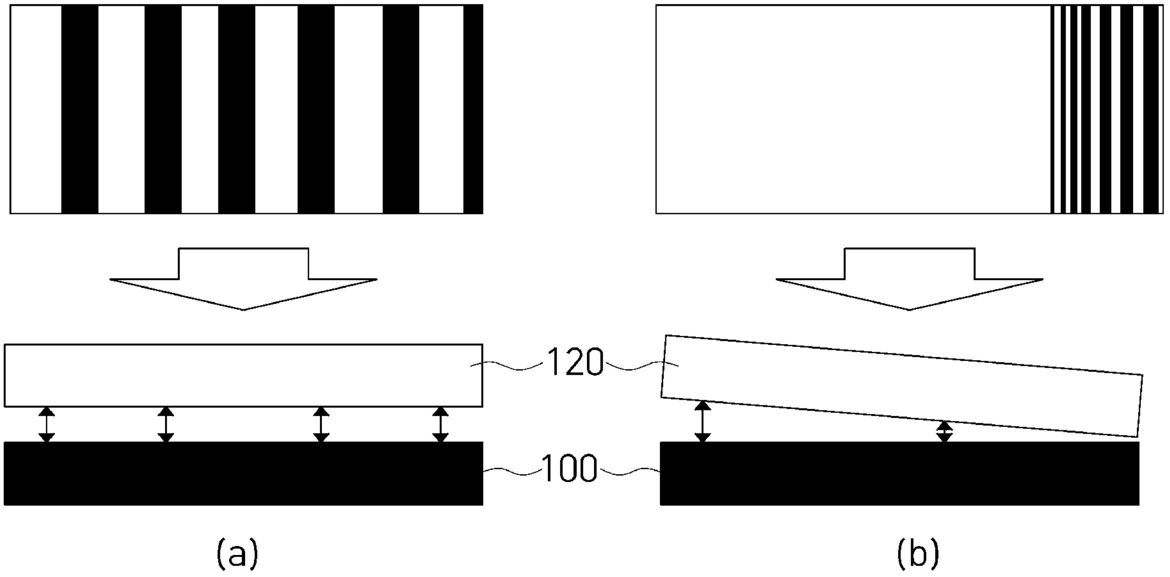
FIG. 5 is a set of explanatory views of shapes of interference patterns generated according to a surface alignment state between an optical waveguide element and a mounting substrate.

FIG. 5 shows a shape of an interference pattern according to an inclination between two objects along contact surfaces of the optical waveguide element 120 and the mounting substrate 100. As in (a), if the reflective surface of the mounting substrate 100 and that of the optical waveguide element 120 are parallel, an intensity of an interference pattern of light reflected between the two surfaces is uniformly distributed over an entire area. On the other hand, if there is a difference in a gap between the two contact surfaces as in (b), as interference of light rays reflected at a smallest gap point occurs strongly, a narrowest and clearest reflective pattern is concentratedly disposed around the point. In addition, the interference of the reflected light decreases as the gap increases, and thus an intensity of the reflective pattern gradually decreases. As a result, when the parallelism between the contact surfaces is maintained, the interference pattern is uniformly generated on a front surface as in (a), but when the two contact surfaces are inclined, the interference pattern is concentrated at the point at which the gap between the two contact surfaces is smallest as in (b).

According to the principle of FIGS. 4 and 5 described above, in the present invention, a parallel alignment state between the substrate support 200 and the mounting substrate 100 and a parallel alignment state between the mounting substrate 100 and the optical waveguide element 120 may be detected by capturing images of interference patterns using the camera 400. When the alignment state of the mounting substrate 100 and the optical waveguide element 120 is detected, the parallelism (that is, alignment) of the mounting substrate 100 and the optical waveguide element 120 may be adjusted by controlling the transport device 300.

Figure 6:
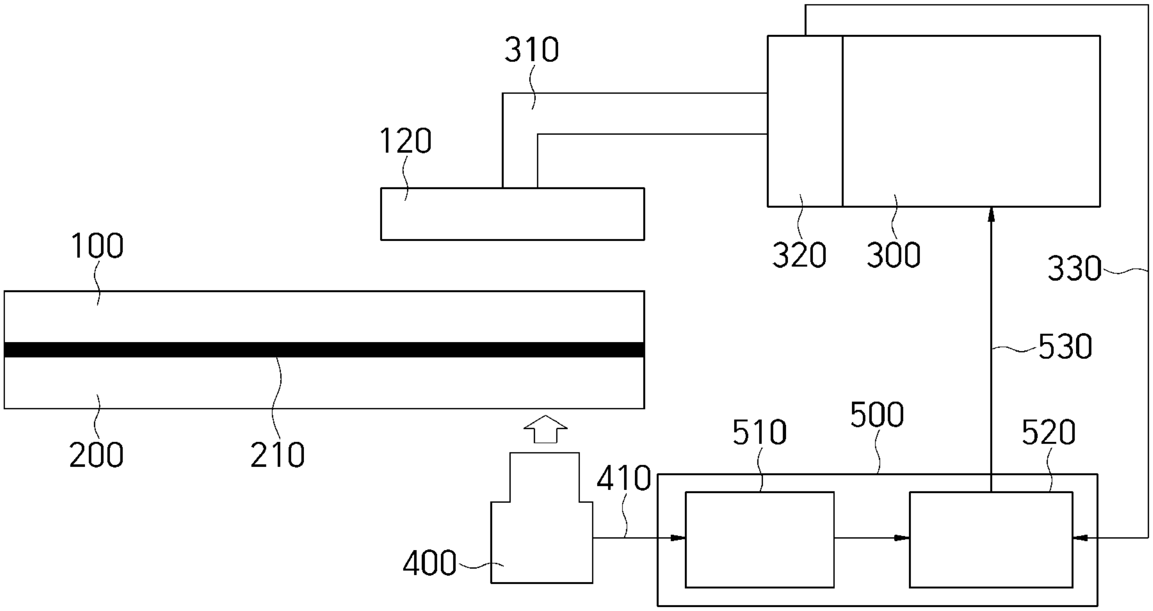
FIG. 6 is a diagram illustrating an optical alignment apparatus of a surface mountable optical module according to another embodiment of the present invention.

FIG. 6 is a diagram illustrating an optical alignment apparatus of a surface mountable optical module according to another embodiment of the present invention. In addition to the embodiment illustrated in FIG. 3, a load sensor 320, which measures a load (a contact pressure) applied when an optical waveguide element 120 comes into contact with a mounting substrate, is additionally included in the optical alignment apparatus. The load sensor 320 may be installed on a transport device 300 and measure a load of the optical waveguide element 120 through a holder 310. The load sensor 320 may measure a load when the optical waveguide element 120 comes into contact with a mounting substrate 100 and provide load data 330. It may feed the load data 330 to the controller 500 (e.g., to the transport device control unit 520 therein). The transport device control unit 520 may consider the load data 330 to generate a control signal 530 for controlling the transport device 300.

In addition to recognizing the interference pattern to maintain the parallelism between the bonding surfaces of the mounting substrate 100 and the optical waveguide element 120 as described above, the embodiment of FIG. 6 has a structure in which the optical waveguide element 120 is spaced apart from the mounting substrate 100 to maintain an optimal gap between the two objects (the mounting substrate 100 and the optical waveguide element 120) by using the load sensor 320. For example, a gap between the mounting substrate 100 and the optical waveguide element 120 is adjusted to allow a coating thickness to be considered when a resin is applied therebetween.

To describe the operation of the load sensor, when the optical waveguide element 120 is mounted on the mounting substrate 100, a contact load (pressure) of the optical waveguide element 120 against the mounting substrate 100 may be monitored using the load sensor 320. The controller 500 (or e.g., the transport device control unit 520 therein) may receive the load data 330 from the load sensor 320, and recognize contact between the optical waveguide element 120 and the mounting substrate 100. Then it may control the transport device 300 as much as a desired separation distance from a point at which the contact is recognized to determine a position of the optical waveguide element 120.

Figure 7:
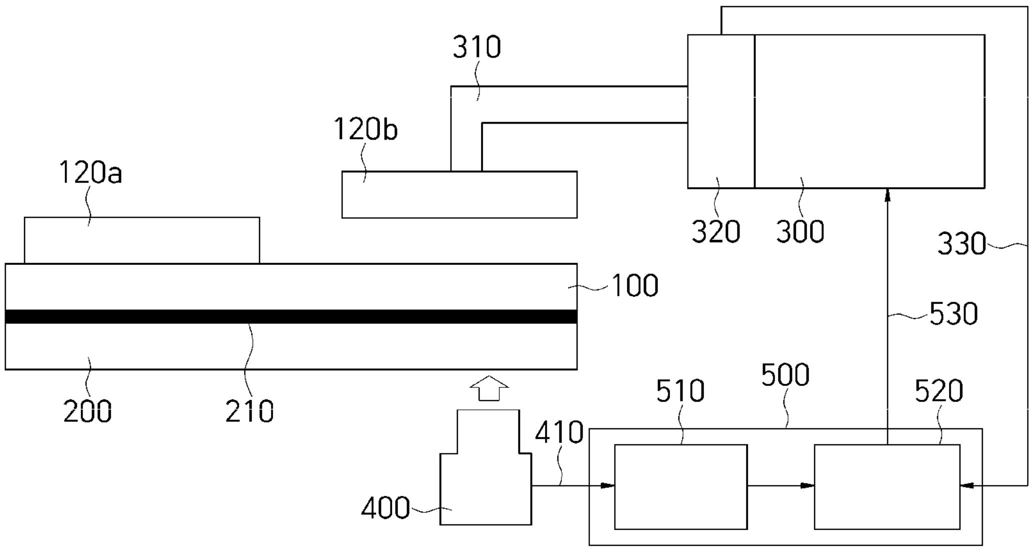
FIG. 7 is an explanatory view of securing of a parallel state between bonding surfaces of an optical waveguide element and a mounting substrate, and of adjustment of a bonding gap by detecting a contact load between the optical waveguide element and the mounting substrate.

FIG. 7 explains that the optical alignment apparatus of the optical module with such a surface mountable joint structure secures a parallel state of bonding surfaces between the optical waveguide element and the mounting substrate and adjusts a bonding gap by detecting a contact load between the optical waveguide element and the mounting substrate.

First, as described with reference to FIG. 3, when in mounting the optical waveguide element 120, a parallel state of the bonding surface of the optical waveguide element 120 and the mounting substrate 100 is secured in advance, through a surface alignment process including interference pattern recognition between the substrate support 200 and waveguide element 120.

As described above and shown in FIG. 7, an optical waveguide element 120*a* mounted on the mounting substrate 100 is secured on the substrate support 200 so that parallel bonding surfaces are achieved. The holder 310 picks up another optical waveguide element 120*b* and transports it to a position, which is adjacent to the already mounted optical waveguide element 120*a* and at which the optical waveguide element 120*b* is to be bonded, for optical alignment. In this case, the load sensor 320 monitors a contact load (pressure) of the optical waveguide element 120*a* against the mounting substrate 100.

The controller 500 (for example, the transport device control unit 520 therein) which has received the load data 330 from the load sensor 320 recognizes contact between the optical waveguide element 120*b* and the mounting substrate 100 and controls the transport device 300 as much as a desired separation distance from a point at which the contact is recognized to move the optical waveguide element 120*b* and determine a position of the optical waveguide element 120*b*.

Through the above process, the optical alignment of optical waveguide elements can be performed easily and precisely, by securing a parallel state between the bonding surfaces of the optical waveguide element 120 and the mounting substrate 100, by determining a position of the optical waveguide element 120*b*, and by precisely controlling a bonding gap.

Figure 8:
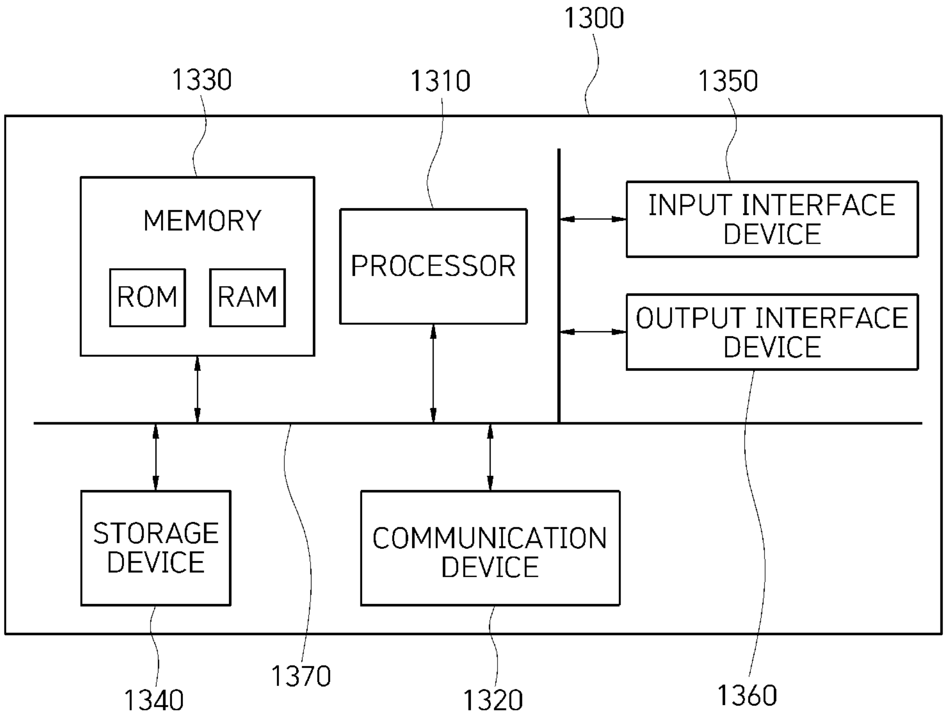
FIG. 8 is a block diagram of a computer system which may be used to implement the present invention.

All the control, settings, data learning, and inference functions required for the operation of the optical alignment apparatus of the present invention described above may be performed by a computer system and a software program. FIG. 8 is a block diagram of a computer system which may be used to implement the present invention. A computer system 1300 illustrated in FIG. 8 may include at least one among a processor 1310, a memory 1330, an input interface device 1350, an output interface device 1360, and a storage device 1340 which communicate through a bus 1370. The computer system 1300 may include a communication device 1320 coupled to a network. The processor 1310 may be a central processing unit (CPU) or a semiconductor device which executes instructions stored in the memory 1330 or the storage device 1340. The communication device 1320 may transmit or receive wired signals or wireless signals. The memory 1330 and the storage device 1340 may include various types of volatile or non-volatile storage media. For example, the memory 1330 may include a read-only memory (ROM) and a random-access memory (RAM). The memory 1330 may be positioned inside or outside the processor 1310 and may be connected to the processor through various known means. The memory 1330 may be various types of volatile or non-volatile storage media and may, for example, include the ROM or the RAM.

Accordingly, the present invention may be implemented through a method implemented in the computer or implemented as a non-transitory computer-readable medium in which computer-executable instructions are stored. In one embodiment, when executed by the processor, the computer-readable instructions may perform the method according to at least one embodiment of the present description.

In addition, the method according to the present invention may be implemented in the form of program instructions that may be performed through various computers and recorded in computer readable media. The computer readable media may include a program instruction, a data file, a data structure, or combinations thereof. The program instructions recorded in the computer readable media may be specially designed and configured for the embodiments of the present invention, or may be available well-known instructions for those skilled in the field of computer software. The computer readable media may include a hardware device configured to store and execute program instructions. For example, the computer readable media may include magnetic media such as a hard disk, a floppy disk, and a magnetic tape, optical media such as a compact disc (CD)-ROM and a digital versatile disc (DVD), magneto-optical media such as a floptical disk, a ROM, a RAM, or a flash memory. The program instructions may include a machine code generated by a compiler and a high-level language code that can be executed in a computer using an interpreter.

According to the present invention which provides a surface mount joint structure, a multi-channel optical module can be manufactured, in which a surface alignment state between an optical waveguide and a mounting substrate is observed to minimize a gap between the bonding surfaces, surface alignment accuracy is improved to secure mechanical strength, process reproducibility, and reliability, and use of a lens is excluded. Thus there is an advantage that an optical module based on a low-cost, miniaturized, and highly integrated optical waveguide can be implemented.

Embodiments which specifically implement the spirit of the present invention have been described above. However, the technical scope of the present invention is not limited to the embodiments and the drawings described above and is determined by a reasonable interpretation of the scope of the claims.

What is claimed is:

1. An optical alignment apparatus of a surface mountable optical module with an optical waveguide element mounted on a mounting substrate, the optical alignment apparatus comprising:

a substrate support on which a mounting substrate is secured;

a holder which holds an optical waveguide element to be mounted on the mounting substrate;

a transport device which transports the optical waveguide element held by the holder;

a camera which outputs image information obtained by capturing an image of an interference pattern generated by light incident on the optical waveguide element; and a controller configured to perform recognition of the interference pattern included in the image information received from the camera, observe parallelism between the substrate support and the mounting substrate and between the mounting substrate and the optical waveguide element using the recognized pattern, generate a control signal to control the transport device according to the observed parallelism, and transmit the control signal to the transport device to perform control of the optical waveguide element, wherein the interference pattern is generated by constructive and destructive interference resulting from a difference in paths between light reflected from contact surfaces of the optical waveguide element and the mounting substrate.

2. The optical alignment apparatus of claim 1, wherein the substrate support is manufactured of a transparent material.

3. The optical alignment apparatus of claim 2, wherein the camera is positioned under the substrate support and captures the image of the interference pattern through the transparent substrate support.

4. The optical alignment apparatus of claim 1, wherein the substrate support includes a reflective surface which reflects light to the mounting substrate.

5. The optical alignment apparatus of claim 1, wherein the interference pattern recognition, the control signal generation, and the control of the optical waveguide element performed by the controller are performed through an artificial intelligence technique.

6. The optical alignment apparatus of claim 1, wherein, when the controller performs recognition of the interference pattern, the parallelism between the substrate support and the mounting substrate and between the mounting substrate and the optical waveguide element is observed whether the interference pattern is formed in a uniform gap.

7. An optical alignment apparatus of a surface mountable optical module with an optical waveguide element mounted on a mounting substrate, the optical alignment apparatus comprising:

a substrate support on which a mounting substrate is secured;

a holder which holds an optical waveguide element to be mounted on the mounting substrate;

a transport device which transports the optical waveguide element held by the holder;

a camera which outputs image information obtained by capturing an image of an interference pattern generated by light incident on the optical waveguide element; and a controller configured to perform recognition of the interference pattern included in the image information received from the camera, observe parallelism between the substrate support and the mounting substrate and between the mounting substrate and the optical waveguide element using the recognized pattern, generate a control signal to control the transport device according to the observed parallelism, and transmit the control signal to the transport device to perform control of the optical waveguide element; and a load sensor which measures a load applied to the mounting substrate by the optical waveguide element, wherein load data obtained by measuring the load when the optical waveguide element comes into contact with the mounting substrate is transmitted to the controller.

8. The optical alignment apparatus of claim 7, wherein the load sensor is installed on the transport device.

9. The optical alignment apparatus of claim 7, wherein the controller receives the load data to recognize the contact between the optical waveguide element and the mounting substrate and controls the transport device as much as a desired separation distance from a point at which the contact is recognized to determine a position of the optical waveguide element.

10. An optical alignment method for a surface mountable optical module with an optical waveguide element mounted on a mounting substrate secured on a substrate support, the method comprising:

outputting, by a camera, image information obtained by capturing an image of an interference pattern generated when light is incident on an optical waveguide element mounted on a mounting substrate; and performing, by a controller including a computer processor, pattern recognition on the interference pattern included in the image information, observing parallelism between the substrate support and the mounting substrate and between the mounting substrate and the optical waveguide element using the recognized pattern, generating a control signal to control a transport device according to the observed parallelism, and performing control of the optical waveguide element using the generated control signal, wherein, when the controller performs the interference pattern recognition, the parallelism between the substrate support and the mounting substrate and between the mounting substrate and the optical waveguide element is observed using whether gaps of interference patterns are uniformly formed.

11. The optical alignment method of claim 10, wherein the interference pattern recognition, the control signal generation, and the control of the optical waveguide element performed by the controller are performed using an artificial intelligence technique.

12. The optical alignment method of claim 10, further comprising transmitting load data, which is obtained by measuring a load applied when the optical waveguide element comes into contact with the mounting substrate, to the controller.

13. The optical alignment method of claim 12, further comprising determining, by the controller including a computer processor, a position of the optical waveguide element by receiving the load data to recognize the contact between the optical waveguide element and the mounting substrate; and controlling, by the controller including a computer processor, the transport device as much as a desired separation distance from a point at which the contact is recognized.

14. The optical alignment apparatus of claim 1, wherein the camera captures the image of the interference pattern generated according to an inclination between the optical waveguide element and the mounting substrate.

15. The optical alignment apparatus of claim 1, wherein the difference in paths corresponds to a gap between the optical waveguide element and the mounting substrate.

16. The optical alignment apparatus of claim 15, wherein the difference in paths varies according to a gap between the optical waveguide element and the mounting substrate.

17. The optical alignment apparatus of claim 1, wherein the contact surfaces include a lower surface of the optical waveguide element, and an upper surface of the mounting substrate, and the optical waveguide element is disposed over the mounting substrate.

18. The optical alignment apparatus of claim 1, wherein the difference in paths is an optical path difference between from first light reflected from the contact surface of the optical waveguide element and second light reflected from the contact surface of the mounting substrate.

* * * * *